(12) United States Patent
Sakamoto et al.

(10) Patent No.: US 8,544,298 B2
(45) Date of Patent: Oct. 1, 2013

(54) GLASS-MELTING FURNACE, PROCESS FOR PRODUCING MOLTEN GLASS, APPARATUS FOR PRODUCING GLASS PRODUCTS AND PROCESS FOR PRODUCING GLASS PRODUCTS

(75) Inventors: Osamu Sakamoto, Tokyo (JP); Chikao Tanaka, Tokyo (JP); Seiji Miyazaki, Tokyo (JP); Satoru Ohkawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/463,193

(22) Filed: May 3, 2012

(65) Prior Publication Data

US 2012/0216571 A1    Aug. 30, 2012

Related U.S. Application Data

(63) Continuation of application No. PCT/JP2010/070747, filed on Nov. 19, 2010.

(30) Foreign Application Priority Data

Nov. 20, 2009  (JP) ................................. 2009-265122

(51) Int. Cl.
   *C03B 5/235* (2006.01)
(52) U.S. Cl.
   CPC ........... *C03B 5/2353* (2013.01); *C03B 2211/40* (2013.01); *C03B 2211/60* (2013.01)
   USPC ....................................... 65/135.6; 65/135.7

(58) Field of Classification Search
   CPC .............. C03B 5/2353; C03B 2211/40; C03B 2211/60; C03B 2211/62
   USPC .................................................. 65/66, 135.6
   See application file for complete search history.

(56) References Cited

U.S. PATENT DOCUMENTS

| 1,992,994 A | 3/1935 | Delpech |
| 3,077,094 A | 2/1963 | Jack et al. |

(Continued)

FOREIGN PATENT DOCUMENTS

| EP | 2 450 316 | 5/2012 |
| JP | 04-228433 | 8/1992 |

(Continued)

OTHER PUBLICATIONS

U.S. Appl. No. 13/335,054, filed Dec. 22, 2011, Sakamoto

(Continued)

*Primary Examiner* — Christina Johnson
*Assistant Examiner* — Cynthia Szewczyk
(74) *Attorney, Agent, or Firm* — Oblon, Spivak, McClelland, Maier & Neustadt, L.L.P.

(57) ABSTRACT

Glass raw material particles are dropped from an oxygen combustion burner 24, and the glass raw material particles are heated by a flame F of an oxygen combustion burner 24 and a thermal plasma P, to melt the particles. Liquid glass particles 30 produced by the melting fall downwardly in a melting tank 12, and fall on a surface of a molten glass liquid G in the melting tank 12. Then, an upper layer G1 of the molten glass liquid G is heated by electrodes 40, 40 of a heating apparatus 38 provided in the melting tank 12. By this method, air and residual gas generated in the molten glass liquid G and the liquid glass particles 30 fallen onto the surface of the molten glass liquid G, become bubbles, surface and are smoothly discharged.

11 Claims, 8 Drawing Sheets

(56) References Cited

U.S. PATENT DOCUMENTS

| | | | | |
|---|---|---|---|---|
| 3,108,149 | A | * | 10/1963 | Carney et al. .................. 373/31 |
| 3,251,669 | A | * | 5/1966 | Dunipace et al. ................ 65/90 |
| 3,337,324 | A | * | 8/1967 | Cable, Jr. et al. ............ 65/136.3 |
| 3,891,422 | A | * | 6/1975 | Froberg et al. ................ 65/137 |
| 4,381,934 | A | * | 5/1983 | Kunkle et al. ................ 65/134.4 |
| 4,632,687 | A | | 12/1986 | Kunkle et al. |
| 4,654,068 | A | | 3/1987 | Kunkle et al. |
| 5,006,144 | A | | 4/1991 | Knavish et al. |
| 5,688,727 | A | * | 11/1997 | Shelestak et al. ............... 501/71 |
| 6,751,989 | B1 | * | 6/2004 | Schmidbauer et al. ......... 65/347 |
| 7,383,698 | B2 | | 6/2008 | Ichinose et al. |
| 2009/0064716 | A1 | | 3/2009 | Sakamoto et al. |
| 2012/0137736 | A1 | | 6/2012 | Sakamoto et al. |
| 2012/0137737 | A1 | | 6/2012 | Sakamoto et al. |
| 2012/0151966 | A1 | | 6/2012 | Sakamoto et al. |
| 2012/0159992 | A1 | | 6/2012 | Sakamoto et al. |
| 2012/0159994 | A1 | | 6/2012 | Sakamoto et al. |

FOREIGN PATENT DOCUMENTS

| | | |
|---|---|---|
| JP | 2005-060134 | 3/2005 |
| JP | 2006-199549 | 8/2006 |
| JP | 2007-297239 | 11/2007 |

OTHER PUBLICATIONS

International Search Report issued Feb. 1, 2011 in PCT/JP2010/07047, filed Nov. 19, 2010.

Supplementary European Search Report issued Mar. 8, 2013 in connection with corresponding European Application No. 10 83 1673, filed Nov. 19, 2010.

* cited by examiner

GLASS-MELTING FURNACE, PROCESS FOR PRODUCING MOLTEN GLASS, APPARATUS FOR PRODUCING GLASS PRODUCTS AND PROCESS FOR PRODUCING GLASS PRODUCTS

TECHNICAL FIELD

The present invention relates to a glass-melting furnace for producing liquid glass particles from glass raw material particles in a high temperature gas phase atmosphere, to produce molten glass; a process for producing molten glass employing the glass-melting furnace; an apparatus for producing glass products employing the melting furnace; and a process for producing glass products using the above process.

BACKGROUND ART

Patent Documents 1 and 2 each discloses as a glass-melting furnace for melting glass raw material particles in a high temperature gas phase atmosphere and accumulating them to produce a molten glass liquid, a glass-melting furnace having a glass raw material particle feed portion and a heating means for forming a high temperature gas phase atmosphere for melting the glass raw material particles in the ceiling portion of the glass-melting furnace.

This glass-melting furnace is an apparatus for melting glass raw material particles, that are fed from the glass raw material particle feed portion into the inside of the furnace, in a high temperature gas phase atmosphere heated by a heating means, to produce liquid glass particles, accumulating the liquid glass particles in a bottom portion of the glass-melting furnace to form molten glass liquid, temporarily storing the molten glass liquid in the bottom portion of the glass-melting furnace, and discharging the molten glass liquid. Further, such a production process of molten glass is known as in-flight glass melting method. In this in-flight glass melting method, as compared with a conventional melting method using a Siemens type furnace, it is possible to reduce consumption of energy in glass-melting step to be about one thirds and to produce molten glass in a short time, and accordingly, it is possible to downsize a melting furnace, omit a regenerator, improve quality, reduce $CO_2$ and to shorten a time for changing glass type. Such an in-flight glass melting method of glass draws attention as a technique for saving energy.

By the way, as the glass raw material particles fed from the glass-raw material particle feed portion, one comprising a mixture of glass raw materials and granulated into a particle size of at most 1 mm, is commonly employed. Each particle of the glass raw material particles fed into the glass-melting furnace is melted to be a liquid glass particle while it falls (flies) in a high temperature gas phase atmosphere, and such liquid glass particles fall downwardly and accumulate in the bottom portion of the glass-melting furnace to form a molten glass liquid. The liquid glass particles produced from the glass raw material particles may be expressed as drops of molten glass. In order to produce the liquid glass particles from the glass raw material particles in the high temperature gas phase atmosphere in a short time, the particle size of the glass raw material particles has to be small as described above. Further, usually, each liquid glass particle produced from each glass raw material particle needs to be a particle having substantially the same glass composition.

Almost all of decomposed gas components, that are generated when the glass raw material particles become liquid glass particles, are discharged to the outside of the liquid glass particles without being contained in the liquid glass particles since both of the glass raw material particles and the liquid glass particles are small particles. Accordingly, there is little risk that bubbles are formed in the molten glass liquid produced by accumulating the liquid glass particles.

Meanwhile, the glass raw material particles are particles having substantially uniform constitution, and glass compositions of liquid glass particles produced from the glass raw material particles are uniform from one another. Since the difference of glass composition among the liquid glass particles is small, there is little risk that glass composition is different between portions of molten glass liquid produced by accumulation of a large number of the liquid glass particles. Accordingly, a homogenizing means for homogenizing the glass composition in molten glass liquid, that has been required in conventional glass-melting furnaces, is scarcely required in in-flight glass melting method. Even if a small amount of liquid glass particles are different from the rest of liquid glass particles in the glass composition, since the molten glass particles are small in the particle size, a heterogeneous region of molten glass liquid, that is produced from the small amount of molten glass particles having different glass composition, is small and such a region is easily homogenized and disappears in a short time. Thus, with the in-flight glass melting method, it is possible to reduce heat energy required for homogenization of molten glass liquid and to shorten a time required for homogenization.

The glass-melting furnaces of Patent Documents 1 and 2 each has a plurality of arc electrodes and/or oxygen combustion nozzles as heating means for forming a high-temperature gas phase atmosphere, and a high-temperature gas phase atmosphere of at least 1,600° C. is formed in the furnace by a thermal plasma arc formed by the plurality of arc electrodes and/or oxygen combustion flames formed by the oxygen combustion nozzles. By feeding glass raw material particles into the high-temperature gas phase atmosphere, the glass raw material particles are changed to liquid glass particles in the high temperature gas phase atmosphere. Further, as glass raw material particles employed in Patent Document 1, ones having a particle size of at most 0.5 mm (weight-averaged) are employed for the reason that they can be changed into liquid glass particles in a short time and dissipation of generated gases is easy. Further, from the viewpoints of cost increase for reduction of the particle size of the glass raw material particles and reduction of the glass composition variation among generated liquid glass particles, ones having a particle size of at least 0.01 mm (weight-averaged) are employed.

The molten glass of about 1,600° C. produced by the glass-melting furnace of Patent Document 1 or 2 is supplied from the glass-melting furnace to a temperature conditioning tank or a refining tank, and is cooled to a temperature at which the glass is formable (about 1,000° C. in a case of soda lime glass). Then, this molten glass is supplied to a forming means of glass products such as a float bath, a fusion forming machine, a roll out forming machine, a blow forming machine or a press forming machine, and formed into glass products having various shapes. Then, the formed glass products are cooled to an approximate room temperature by an annealing means, and thereafter, subjected to a cutting step by a cutting means and/or other back-end steps as the case requires, to produce desired glass products.

PRIOR ART DOCUMENTS

Patent Documents

Patent Document 1: JP-A-2006-199549
Patent Document 2: JP-A-2007-297239

DISCLOSURE OF INVENTION

Technical Problem

In the glass-melting furnace disclosed in Patent Documents 1 and 2, liquid glass particles fallen on molten liquid glass surface are taken into the molten glass liquid that has been melted earlier, and the melt further proceeds to produce a molten glass containing no unmelted material.

However, when liquid glass particles continuously fall on the same position on the surface of the molten glass liquid, a gas such as an air present in the glass-melting furnace tends to be involved in the liquid glass particles or the molten glass liquid, which may cause to produce bubbles. Bubbles produced at a time of fall of the liquid glass particles are bubbles produced by a gas such as an air or a combustion gas involved between the liquid glass particles or between the liquid glass particles and the molten glass liquid. For example, before a substantially spherical liquid glass particle that has fallen into contact with a surface of the molten glass liquid is integrated into the molten glass liquid to form a flat surface, another liquid glass particle may fall onto the unflattened liquid glass particle to involve a gas such as an air between such both liquid glass particles or between such both liquid glass particles and the surface of the molten glass liquid in some cases.

Here, as bubbles formed by contact of the liquid glass particles with the molten glass liquid surface, although the possibility is low, in a case where liquid glass particle that has just melted in a high temperature gas atmosphere contains e.g. a residual gas, the residual gas contained in the liquid glass particle may form a bubble when other liquid glass particles overlap with the liquid glass particle containing the residual gas, just before or just after it contacts with the molten glass liquid to be integrated with the molten glass liquid.

Thus, in the glass-melting furnace of Patent Documents 1 and 2, there has been a demerit that it is not possible to produce a molten glass having a good quality having few bubbles in some cases.

Further, Patent Document 2 discloses a technique of periodically stirring a liquid surface of molten glass to diffuse molten glass liquid particles fallen into the molten glass liquid surface, but when the liquid surface is stirred, there has been a problem that air and residual gas taken into the molten glass liquid is diffused to be contained in the molten glass despite the intention, which may lower the degassing efficiency and prevent production of molten glass having a good quality in some cases.

The present invention has been made under the circumstances, and it is an object of the present invention to provide a process for producing molten glass, a glass-melting furnace, a process for producing glass products and an apparatus for producing glass products, which can produce a molten glass having a good quality.

Solution to Problem

The present inventors have conducted extensive studies as to the above objects, and as a result, they have obtained the following knowledge.

Namely, they have obtained a knowledge that in order to erase bubbles expected in the in-flight melting method, it is effective to erase these bubbles on a surface of molten glass liquid that is a portion wherein these bubbles are generated.

Here, in a so-called cold top type electric melting furnace, which is adapted to receive a relatively low-temperature unmelted powder-form raw material on a molten glass liquid surface, and is configured to melt the glass raw material by an electrode disposed in the molten glass, a layer of glass in half-molten state is formed on the interface between the molten glass and the glass raw material. This layer of glass is so-called crust layer. The crust layer contains also bubbles generated by a mechanism similar to that of bubbles generated at a time of fall of particles onto the liquid that is a problem to be solved by the present invention. When the upper layer of the molten glass liquid is heated to reduce unmelted glass in order to reduce the crust layer, the following two problems occur. First, since it is necessary to provide electrodes at a position in a middle layer of the molten glass liquid at least about 30 cm below the molten glass liquid surface considering the convection characteristic of the molten glass liquid, the temperature of the middle and lower layers of the molten glass liquid becomes high in the temperature distribution in the depth direction, and it is difficult to sufficiently heat the upper layer for the reason of electric current line even if additional electrodes are disposed in the upper layer. Second, when the electrodes are disposed in the upper layer of the molten glass liquid, due to temperature rise in the vicinity of the electrodes, a locally heated portion is formed, which causes local accumulation of gas under the crust layer to make the crust layer a balloon shape. As a result, cracks are formed through the crust layer and a glass raw material layer functioning as a heat insulating layer on the crust layer, the molten glass liquid is partially exposed to the outside, and heat dissipation amount from the molten glass liquid under the crust layer increases. These problems prevent stable production. Among these, the second problem may occur also in an electric boosting in a conventional Siemens furnace.

For the above reasons, in conventional glass-melting furnaces, a method of positively heating the upper layer of molten glass liquid, particularly in the vicinity of the surface of the molten glass liquid, for the purpose of e.g. erasing bubbles, is not employed.

Further, because of the characteristic of in-flight melting method, even if the upper layer of molten glass liquid, particularly in the vicinity of the molten glass liquid surface, is positively heated, liquid glass particles melted in a high-temperature gas phase atmosphere are relatively uniformly deposited on an upper layer of accumulated molten glass liquid, and generation of a crust layer itself does not occur.

Further, the present inventors have discovered in their study that in an in-flight melting method, convection of molten glass liquid is stable up to relatively upper layer as compared with convention in an electric melting furnace. In addition, in a melting furnace of in-flight melting method, differently from an electric melting furnace, the temperature of the upper layer of the molten glass liquid is high from the beginning. Accordingly, the present inventors have also discovered that in the in-flight melting method, turbulence of convection caused by heating of an upper layer of the molten glass liquid is reduced.

Namely, they have discovered that although it is difficult to positively carry out heating in the vicinity of molten glass liquid surface in conventional melting furnaces, in the in-flight melting method, it is possible to positively heat the molten glass liquid in the vicinity of its surface. Thus, it is essential to carry out extensive studies with respect to characteristics of the in-flight melting method in order to smoothly promote degassing of a molten glass liquid and liquid glass particles fallen onto the molten glass liquid, that is an object of the present invention.

The present invention thus conceived provides a glass-melting furnace for changing glass raw material particles into liquid glass particles in a gas phase atmosphere in the glass-melting furnace, accumulating the liquid glass particles in a bottom portion of the glass-melting furnace to obtain a molten glass liquid and discharging the molten glass liquid;

the furnace comprising a glass raw material feed portion disposed downwardly from a furnace wall portion in an upper portion of the glass-melting furnace;

a first heating means for forming a gas phase portion under the glass raw material particle feed portion for changing the glass raw material particles into liquid glass particles;

a second heating means for heating an upper layer of the molten glass liquid;

a furnace bottom portion for accumulating the liquid glass particles to form the molten glass liquid; and a discharge portion for discharging the molten glass liquid.

In the above description, "accumulating the liquid glass particles to form the molten glass liquid" includes letting liquid glass particles fall onto a surface of molten glass liquid accumulated in the bottom portion of the glass-melting furnace to produce further molten glass liquid. Further, "discharging the molten glass liquid" includes continuously discharging the accumulated molten glass liquid.

In the glass-melting furnace of the present invention, it is preferred that the second heating means is disposed so that the upper end of a heating portion of the heating means is present within 20 cm, particularly within 15 cm below a planned surface level of the molten glass liquid. Here, the planned surface level of the molten glass liquid means a surface of molten glass liquid in a state that the glass-melting furnace is stably operated.

In the glass-melting furnace of the present invention, it is preferred that the second heating means is disposed so that at least a part of the upper end or the leading edge of a heating portion of the heating means is present within 20 cm, particularly within 15 cm below a planned surface level of the molten glass liquid.

In the glass-melting furnace of the present invention, it is preferred that the second heating means is disposed so that the lower end of a heating portion of the heating means is present less than 50 cm below a planned surface level of the molten glass liquid.

In the glass-melting furnace of the present invention, it is preferred that the second heating means is an electric heating means having electrodes for supplying electricity to the molten glass liquid, or a heat-generating body.

In the glass-melting furnace of the present invention, it is preferred that the heat-generating body has a heat-generating means for heating the molten glass liquid by thermal conduction.

In the glass-melting furnace of the present invention, it is preferred that the heat-generating body is a plate-shaped body having a heat-generating surface disposed in the horizontal direction.

In the glass-melting furnace of the present invention, it is preferred that the heat-generating body is a combustion gas tube disposed so that the axis of the combustion tube is in the horizontal direction.

In the glass-melting furnace of the present invention, it is preferred that the first heating means is an oxygen combustion burner producing an oxygen combustion flame or a multiphase arc plasma generation apparatus constituted by at least a pair of electrodes producing thermal plasma.

The present invention provides a process for producing molten glass, which is a process of changing glass raw material particles into liquid glass particles by using the above glass-melting furnace.

The present invention provides a process for producing molten glass, which is a process of changing glass raw material particles into liquid glass particles in a gas phase atmosphere in a glass-melting furnace and accumulating the liquid glass particles in a bottom portion of the glass-melting furnace to obtain a molten glass liquid; the process comprising:

feeding the glass raw material particles downwardly from a furnace wall portion in an upper portion of the glass-melting furnace to let the particles pass through a gas phase portion formed by a first heating means, to change the particles into liquid glass particles;

accumulating the liquid glass particles to form a molten glass liquid; and heating an upper layer of the molten glass liquid by a second heating means.

In the process for producing molten glass of the present invention, it is preferred that the heating of the upper layer of the molten glass liquid is carried out in a state that the upper end of the heating portion is present within 20 cm, particularly within 15 cm below a surface of the molten glass liquid.

In the process for producing molten glass of the present invention, it is preferred that the heating of the upper layer of the molten glass liquid is carried out in a state that the lower end of the heating portion is present less than 50 cm below a surface of the molten glass liquid.

In the process for producing molten glass of the present invention, it is preferred that the upper layer of the molten glass liquid is heated so that the viscosity of the upper layer of the molten glass liquid becomes at most 30 Pa·sec.

In the process for producing molten glass of the present invention, it is preferred that the upper layer of the molten glass liquid is heated to be at least 1,450° C. in a case where the molten glass is soda lime glass.

The present invention provides an apparatus for producing glass products, comprising the above glass-melting furnace, a forming means for forming a molten glass, that is provided on the downstream side of the discharge portion of the glass-melting furnace, and an annealing means for annealing the formed glass.

The present invention provides a process for producing glass products, comprising a step of producing molten glass by the above process for producing molten glass, a step of forming the molten glass, and a step of annealing the formed glass.

Advantageous Effects of Invention

As described above, in the glass-melting furnace and the process for producing molten glass of the present invention, since it is possible to smoothly promote degassing of molten glass liquid and liquid glass particles fallen onto a surface of the molten glass liquid, it is possible to produce a molten glass having a good quality.

Further, in the apparatus for producing glass products and the process for producing glass products of the present invention, since it is possible to produce a large amount of molten glass having a good quality by the glass-melting furnace and the process for producing molten glass of the present invention, it is possible to produce glass products having good quality for long duration.

DESCRIPTION OF EMBODIMENTS

Now, preferred embodiments of the process for producing molten glass, the glass-melting furnace, the process for producing glass products and the apparatus for producing glass products of the present invention will be described with reference to attached drawings.

In the illustrated glass-melting furnace, a first heating means for forming a gas phase portion having a high temperature comprises an oxygen combustion burner. The gas phase portion, that is a gas phase atmosphere, is constituted by the inside of a flame of oxygen combustion burner and a high-temperature portion in the vicinity of the flame.

A glass raw material particle feed portion for feeding glass raw material particles to the gas phase portion is integrated with the oxygen combustion burner, and a tube for supplying a combustion gas, a tube for supplying oxygen and a tube for feeding glass raw material particles are coaxially arranged in the vicinity of the outlet of the oxygen combustion burner. This combination of the glass raw material particle feed portion and the oxygen combustion burner is referred to as glass raw material particle heating unit.

Figure 1:
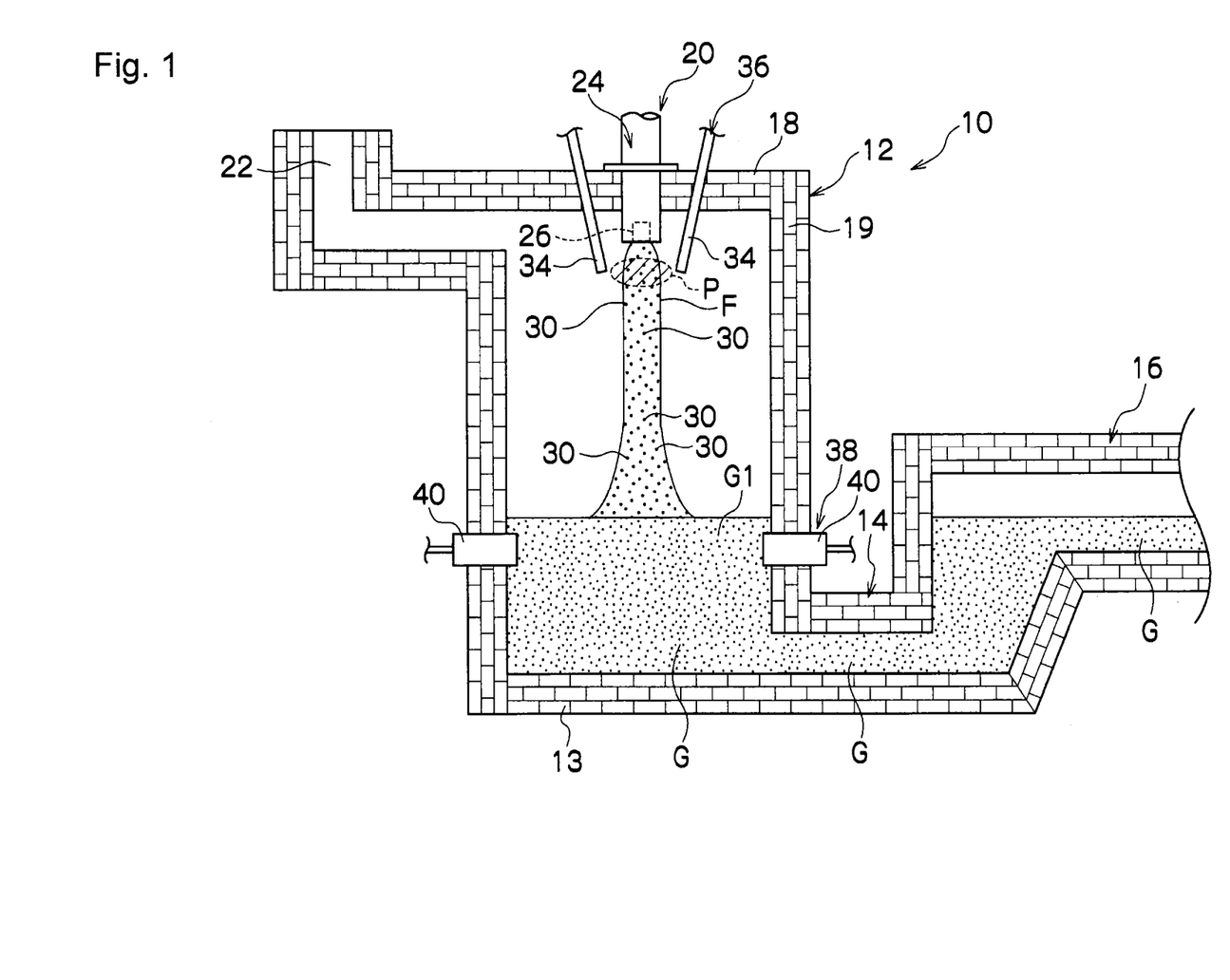
FIG. 1 is a vertical cross-sectional view of a glass-melting furnace of a first embodiment constituting the apparatus for producing glass products of the present invention.
Figure 2:
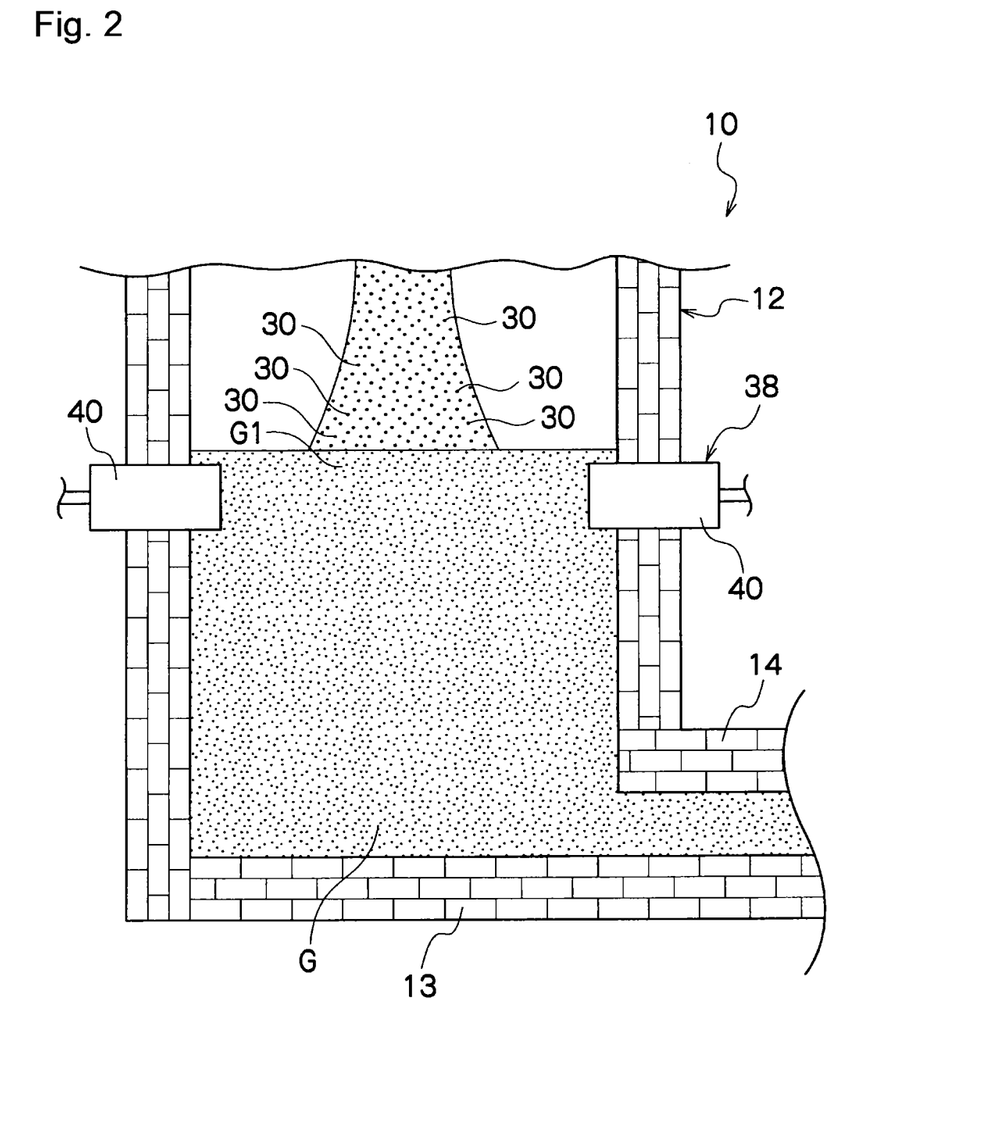
FIG. 2 is a structure view of the heating apparatus of the first embodiment shown in FIG. 1.

FIG. 1 is a vertical cross-sectional view of a glass-melting furnace 10 of a first embodiment constituting an apparatus for producing glass products of the present invention, and FIG. 2 is a vertical cross-sectional view of the glass-melting furnace 10.

As shown in FIG. 1, the glass-melting furnace 10 has a melting tank 12 and a discharge port 14 of molten glass liquid G, and the melting tank 12 and the outlet are constituted by known refractory bricks. Further, on a ceiling wall 18 being a furnace wall portion in the upper portion of the melting tank 12, one glass raw material particle heating unit 20 is disposed, whereby a high-temperature gas phase portion for changing glass raw material particles into liquid glass particles is formed in the in-furnace gas phase atmosphere.

Accordingly, in the melting tank 12, the glass raw material particle heating unit 20 is disposed on the upstream side in the flow direction of molten glass liquid G. The homogeneity of the molten glass liquid G produced by accumulation of liquid glass particles at a position under the glass raw material particle heating unit 20, increases as the molten glass liquid G flows to the downstream side. Further, the molten glass is cooled to a predetermined temperature, and supplied to a forming apparatus of glass products. The melting tank 12, the discharge port 14 and a degassing vessel 16 are constituted by known refractory bricks. Further, the glass raw material particle heating unit 20 is provided downwardly so as to penetrate through a flat ceiling wall 18 of the melting tank 12. This glass raw material particle heating unit 20 will be described later.

Here, the shape of the melting tank is not limited to a rectangular solid shape, but it may be a cylindrical shape. Further, the glass raw material heating unit 20 is disposed in a vertical downward direction, but the construction is not limited thereto, and it may be disposed in an oblique downward direction. Further, the ceiling wall 18 of the melting tank 12 has a flat shape, but the construction is not limited thereto, and it may have an arch shape or a dome shape, etc.

Meanwhile, on a side of the glass raw material particle heating unit 20, a flue 22 is provided. This flue 22 is connected to a suction fan via a cooling apparatus and a dust-collection apparatus, that are not shown, and by operating the suction fan, a high-temperature exhaust gas in the melting tank 12 is suctioned through the flue 22. This exhaust gas is cooled to a predetermined temperature by the cooling apparatus, and dust in the exhaust gas is removed by the dust-collection apparatus, and the exhaust gas is exhausted to the outside by the suction fan.

Further, a case where the glass raw material particle heating unit 20 is not provided on the ceiling wall 18 but on a side wall in the upper portion of the melting tank 12, is also an embodiment of the present invention. In the case where the glass raw material particle heating unit 20 is provided on the side wall, the glass raw material particle heating unit 20 is provided on the side wall at a height within 1 m in the vertical direction from the inner wall of the ceiling wall 18 of the melting tank 12. If the glass raw material particle heating unit 20 is provided at a position exceeding 1 m in the vertical direction from the inner wall of the ceiling wall 18 of the melting tank 12, the vertical distance from the molten glass liquid surface becomes so small that the angle of the glass raw material particle heating unit 20 to the horizontal direction becomes small. Accordingly, the glass raw material particles are blown against an opposed wall face, whereby corrosion of the wall face and subsequently contamination of glass caused by the corrosion occur. In order to prevent such a problem, it is preferred to provide the glass raw material particle heating unit 20 on the side wall at a height within 1 m in the vertical direction from the inner wall of the ceiling wall 18. The glass raw material particle heating unit 20 is preferably provided at a height within 90 cm, more preferably at a height within 50 cm in the vertical direction from the inner wall of the ceiling wall 18 of the melting tank 12.

In each of the melting tank 12, the discharge port 14 and the degassing vessel 16, a molten glass liquid G is stored, and the molten glass liquid G produced in the melting tank 12 flows through the discharge port 14 to the degassing vessel 16, the molten glass liquid G is refined and cooled to a predetermined temperature in the degassing vessel 16, and is supplied to a forming apparatus of glass products.

As the glass raw material particle heating unit 20, as described above, an oxygen combustion burner 24 wherein the glass raw material particle feed portion is integrated with the heating means is employed.

The oxygen combustion burner 24 may be an oxygen combustion burner wherein supply nozzles of raw material, fuel and combustion supporting gas are appropriately arranged, that is known as a burner for heating inorganic powder. This oxygen combustion burner 24 has a straight rod shape, and a nozzle 26 in the leading edge of the burner is constituted by a fuel supply nozzle, a combustion support gas supply nozzle for primary combustion, a glass raw material particle supply nozzle and a combustion support gas supply nozzle for secondary combustion that are entirely arranged in a concentric form in this order from the center toward the peripheral portion. From the nozzle 26, a flame F is blown downwardly and glass raw material particles are fed from the glass raw material particle supply nozzle by gas conveyance or mechanical conveyance into the flame F (that is the first gas phase portion). By this method, it is possible to securely change the glass raw material particles into liquid glass particles in a short time. Here, although not shown, a glass raw material particle supply line for supplying glass raw material particles to the glass raw material particle supply nozzle, a fuel supply line for supplying a fuel to the fuel supply nozzle, and a gas supply line for supplying a combustion support gas to the combustion support gas supply nozzle for primary combustion and the combustion support gas supply nozzle for secondary combustion, are connected to the oxygen combustion burner 24.

Thus, when the oxygen combustion burner 24 wherein the glass raw material particle feed portion is integrated with the raw material particle heating unit is employed, since the oxygen combustion burner 24 functions also as the glass raw material particle feed portion, it is not necessary to provide a glass raw material particle feed portion separately. However, a glass raw material particle feed portion for feeding glass raw material particles to the flame F of the oxygen combustion burner 24, may be separately provided so as to be adjacent to the oxygen combustion burner 24.

In the glass-melting furnace of the present invention, the first heating means for forming the high temperature gas phase portion may be, besides the oxygen combustion burner 24, a multiphase arc plasma generation apparatus 36 for producing thermal plasma P, which is constituted by at least a pair of electrodes 34, 34 and provided through the ceiling wall 18 of the melting tank 12. With this multiphase arc plasma generation apparatus 36, the gas phase portion is constituted by an arc plasma generation region and a high temperature portion in the vicinity of the region. Further, as the first heating means, both of the oxygen combustion burner 24 and the multiphase arc plasma generating apparatus may be provided in the melting tank 12. Further, the temperatures of the flame F and the thermal plasma P are preferably set to be at least 1,600° C., that is higher than the melting temperature of silica sand, in order to quickly vaporize and dissipate a gas produced by quick decomposition of decomposable components (such as carbonates) contained in the glass raw material particles (hereinafter referred to as vaporization and dissipation) and to promote vitrification reaction together with other glass raw materials. By this method, the glass raw material particles fed in the furnace are quickly vaporized and dissipated by the flame F and/or the thermal plasma P, and by the heat of high temperature, they become liquid glass particles and fall on the molten glass liquid G in the melting tank 12. Then, an upper layer of the molten glass liquid G formed by accumulation of the liquid glass particles is continuously heated by the flame F and/or the thermal plasma P and by radiation heat from furnace wall. In the figure, particles 30 shown inside or under the flame F show particles that are glass raw material particles becoming to liquid glass particles or liquid glass particles. Since the glass raw material particles are considered to become liquid glass particles quickly in the flame, hereinafter the particles are also referred to as liquid glass particles 30.

Further, the liquid glass particles 30 fallen onto the surface of molten glass liquid G in the melting tank 12 are further heated by a heating apparatus (second heating means) 38 provided in the melting tank 12. By this heating, degassing of the molten glass liquid G and the liquid glass particles fallen onto the surface of the molten glass liquid G is promoted. Here, the central temperature of the flame F is about 2,000° C. in the case of oxygen combustion, and it is from 5,000 to 20,000° C. in the case of thermal plasma P.

The average particle size (weight-averaged) of the glass raw material particles is preferably from 30 to 1,000 µm. More preferably, glass raw material particles having an average particle size (weight-averaged) within a range of from 50 to 500 µm are employed, and glass raw material particles within a range of from 70 to 300 µm are still more preferred. The average particle size (weight-averaged) of the liquid glass particles that are produced by melting the glass raw material particles, is about 80% of the average particle size of glass raw material particles in most cases.

The heating apparatus 38 as the second heating means, is, as shown in FIG. 2, constituted by a plurality of pairs of electrodes 40, 40 disposed through the side wall of the melting tank 12. These electrodes 40, 40 each has a rod shape, and are disposed substantially horizontally at the same height in the melting tank 12 so as to heat an upper layer G1 of the molten glass liquid G stored in the melting tank 12. Namely, by applying a voltage to the electrodes 40, 40, electric current through the upper layer G1 of the molten glass liquid is caused to heat the upper layer G1 of the molten glass liquid. As the electrode 40, a heat-resistant electrode made of molybdenum, platinum, tin oxide, etc. is mentioned. Here, the upper layer G1 of the molten glass liquid G means a layer present at a position within ⅓ of the height of molten glass liquid from the furnace bottom portion (or the depth of molten glass liquid) in this specification.

Next, functions of the glass-melting furnace having the above construction will be described.

Glass raw material particles are dropped from the oxygen combustion burner 24, and heated by a flame F of an oxygen combustion burner 24 and a thermal plasma P to melt the particles. Liquid glass particles 30, 30 . . . produced by melting the glass raw material particles fall downwardly in the melting tank 12 and fall onto a surface of molten glass liquid G in the melting tank 12.

Then, by the electrodes 40, 40 of the heating apparatus 38 provided in the melting tank 12, an upper layer G1 of the molten glass liquid is heated. The position of the heating apparatus 38 is set to a position for heating the upper layer of the molten glass liquid. With this construction, formation of bubbles of air and residual gas generated in the molten glass liquid G and liquid glass particles 30, 30 (upper layer of molten glass liquid G) fallen onto a surface of molten glass liquid G, is promoted at the generation position, and the bubbles are smoothly discharged from the molten glass liquid G and the liquid glass particles 30, 30 . . . that are melted.

As described above, with the glass-melting furnace of this embodiment of the present invention, since it is possible to smoothly promote degassing of molten glass liquid G and liquid glass particles 30 fallen onto the surface of the molten glass liquid G, it is possible to produce a molten glass having a good quality. Further, even if a large amount of glass raw material particles are supplied, piling up of unmelted glass raw material particles is prevented by high heat of the heating apparatus 38, whereby the glass-melting furnace is suitable as a large-scale melting furnace for producing at least tens of tons/day or at least hundreds of tons/day of glass products.

Here, in the glass-melting furnace 10 of the embodiment of the present invention, since degassing of molten glass liquid G or liquid glass particles 30 fallen onto the surface of the molten glass liquid G in the melting tank 12 is promoted, it is possible to omit the degassing vessel 16. In such a case, it is sufficient that the molten glass liquid G is directly supplied from the melting tank 12 to the forming apparatus via a temperature conditioning bath for temperature conditioning or a conveying path such as a throat.

In the heating apparatus 38, e.g. application voltage for heating the molten glass liquid G is set so that the viscosity of a surface of the molten glass liquid G in the melting tank 12 becomes at most 30 Pa·sec. When the viscosity is at most 30 Pa·sec, degassing of liquid glass particles 30, 30 . . . is promoted, such being preferred. This is because when the viscosity is at most 30 Pa·sec, bubbles easily surface from the upper layer of the molten glass liquid and bubbles remaining in the liquid glass particles are reduced. Specifically, in the in-flight melting method, the liquid glass particles are assumed to be accumulated at a speed of 1 to 3 mm/min. Accordingly, in order to make e.g. bubbles float in the molten glass liquid G, it is preferred to set a viscosity so that the bubbles can surface with a surfacing speed higher than the accumulation speed of the liquid glass particles. Here, in the in-flight melting method, since bubbles surfaced are easily broken by fall of the liquid glass particles, the viscosity can be set slightly higher than the value calculated from the accumulation speed. Considering this factor, it is sufficient that the molten glass is heated so that the viscosity becomes at most 30 Pa·sec from the viewpoint of surfacing of bubbles having a size of about 0.3 mm, whereby it is possible to sufficiently reduce bubbles. Accordingly, the molten glass is preferably heated so that the viscosity becomes at most 10 Pa·sec. Further, the molten glass is more preferably heated so that the viscosity becomes at most 3 Pa·sec.

Since the viscosity changes depending on the composition of glass, for example, in a case of soda lime glass, it is preferred to heat the molten glass to about 1,450° C. by the heating apparatus 38. The molten glass is preferably heated to about 1,500° C. by the heating apparatus 38. The molten glass is more preferably heated to 1,550° C. by the heating apparatus 38.

Further, a heating portion of the heating apparatus 38, that is electrodes 40, 40, is disposed so that its upper end is present within 20 cm below the surface of the molten glass liquid G. When the position is within 20 cm, the electrodes 40, 40 are not too far from the surface of molten glass liquid G, liquid glass particles 30, 30 . . . (upper layer of molten glass liquid G) fallen onto the surface of molten glass liquid G are sufficiently heated, and promotion of degassing is smoothly performed, such being preferred. If the position is more than 20 cm below the surface, bubbles are involved in a downward convection flow generated in the molten glass liquid G, whereby the bubbles may not surface. When the position is within 15 cm, the electrodes are close to the surface of molten glass liquid G, and it is possible to directly heat liquid glass particles 30, 30 . . . fallen onto the surface of the molten glass liquid G, whereby degassing is more smoothly promoted, such being preferred. When the position is within 10 cm, the electrodes are further close to the surface of molten glass liquid G, and liquid glass particles 30, 30 . . . fallen onto the surface of the molten glass liquid G are further directly heated, whereby degassing of the molten glass liquid G and liquid glass particles 30 fallen onto the surface of the molten glass liquid G is still more smoothly promoted, such being preferred. When the position is within 5 cm, the electrodes are still more close to the surface of molten glass liquid G, and it is possible to further directly heat the liquid glass particles 30, 30 . . . fallen onto the surface of the molten glass liquid G, whereby degassing of the molten glass liquid G and liquid glass particles 30 fallen onto the surface of the molten glass liquid G is still more smoothly promoted, such being more preferred. The upper end of the heating portion described above means an upper end surface of an upper end of a portion where heating actually takes place in a case of electrodes for electric heating, and the upper end means an upper surface of a mesh plate in a case of heat-generating body using a mesh plate to be described later, and further, the upper end means an upper surface of a combustion tube in a case of heat-generating body using a combustion tube to be described later.

Here, at a time of disposing the heating apparatus as the second heating means, when the heating apparatus is an electrode susceptible to oxidization, it is necessary that the upper end does not protrude from the molten glass liquid. This is because if the electrode is exposed to the atmosphere in the furnace, the electrode is oxidized to shorten the lifetime.

Further, the electrodes 40, 40 of the heating apparatus 38 are preferably disposed so that their lower ends are present less than 50 cm below the surface of the molten glass liquid G. When the positions of the lower ends of the electrodes 40, 40 are less than 50 cm below the surface of the molten glass liquid G, the entire electrodes are not too far from the upper layer of the molten glass liquid, whereby the upper layer can be sufficiently heated. When the positions of the lower ends of the electrodes 40, 40 are at most 30 cm below the surface of the molten glass liquid G, the entire electrodes are more close to the upper layer of the molten glass liquid, whereby degassing is further promoted, such being preferred. Further, the positions of the lower ends of the electrodes 40, 40 are at most 20 cm below the surface of the molten glass liquid G, the entire electrodes are further close to the upper layer of the molten glass liquid, whereby degassing is further promoted, such being preferred. The upper end of the heating unit described above means a lower end surface of a lower end of a portion where heating actually takes place in a case of electrodes for electric heating, and the lower end means a lower surface of a mesh plate in a case of a heat-generating body employing a mesh plate to be described later, and the lower ends means a lower surface of a combustion tube in a case of a heat-generating body employing a combustion tube to be described later.

Figure 3:
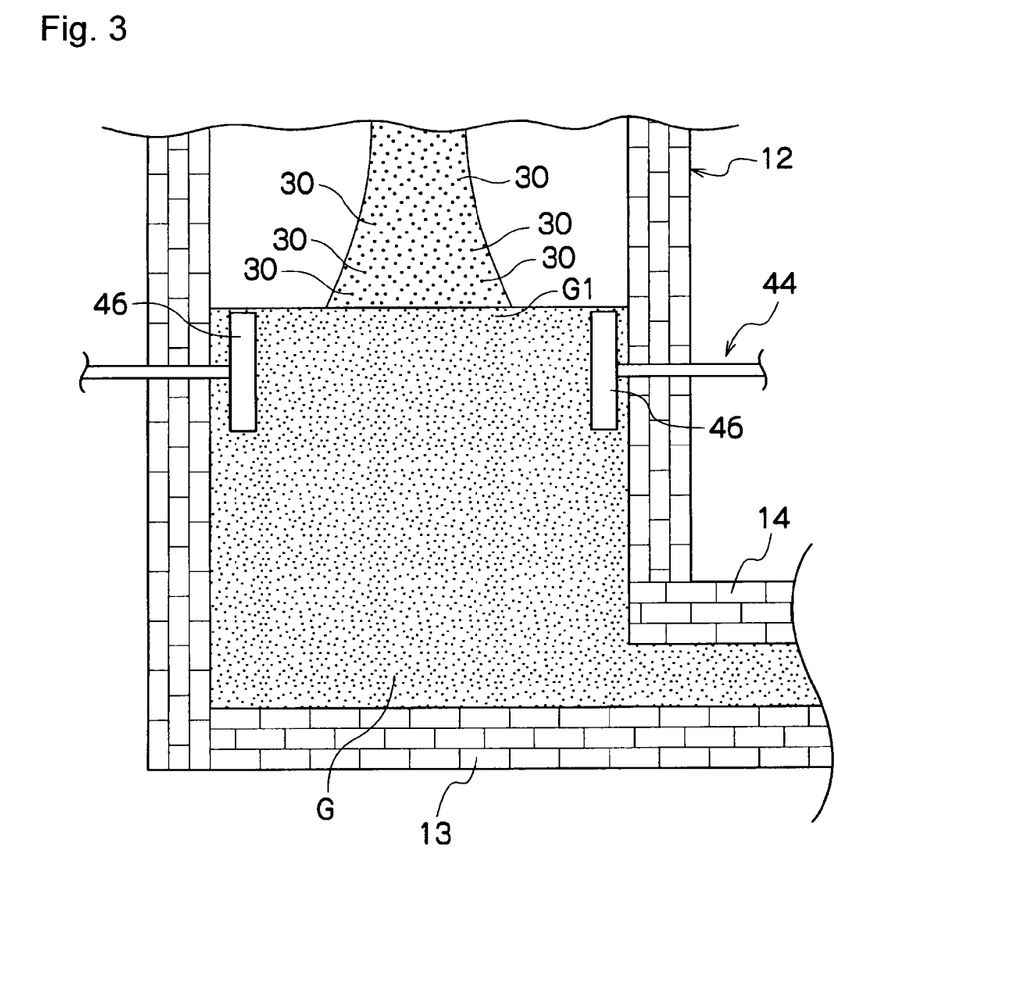
FIG. 3 is a structure view of a heating apparatus of a second embodiment.

FIG. 3 is a structure view of a heating apparatus 44 as a second heating means according to a second embodiment.

Heating portions of the heating apparatus 44 shown in the figure that are electrodes 46, 46, are each formed to have a plate shape, and they are disposed substantially horizontally at the same height position in a melting tank 12. In this example, the electrodes 46, 46 are disposed so that upper end surfaces of their upper ends are present within 15 cm below the surface of molten glass liquid G. Other parameters (such as heating temperature) are the same as those of the heating apparatus 38 shown in FIG. 2. Accordingly, in the heating apparatus 44 of FIG. 3, effects similar to those of the heating apparatus 38 shown in FIG. 2 can be obtained. Further, in a case of disposing the electrodes 46, 46 so that the upper end surfaces of the upper ends of the electrodes 46, 46 are present within 20 cm below the surface of the molten glass liquid G, degassing of the molten glass liquid G was smoothly promoted.

Figure 4:
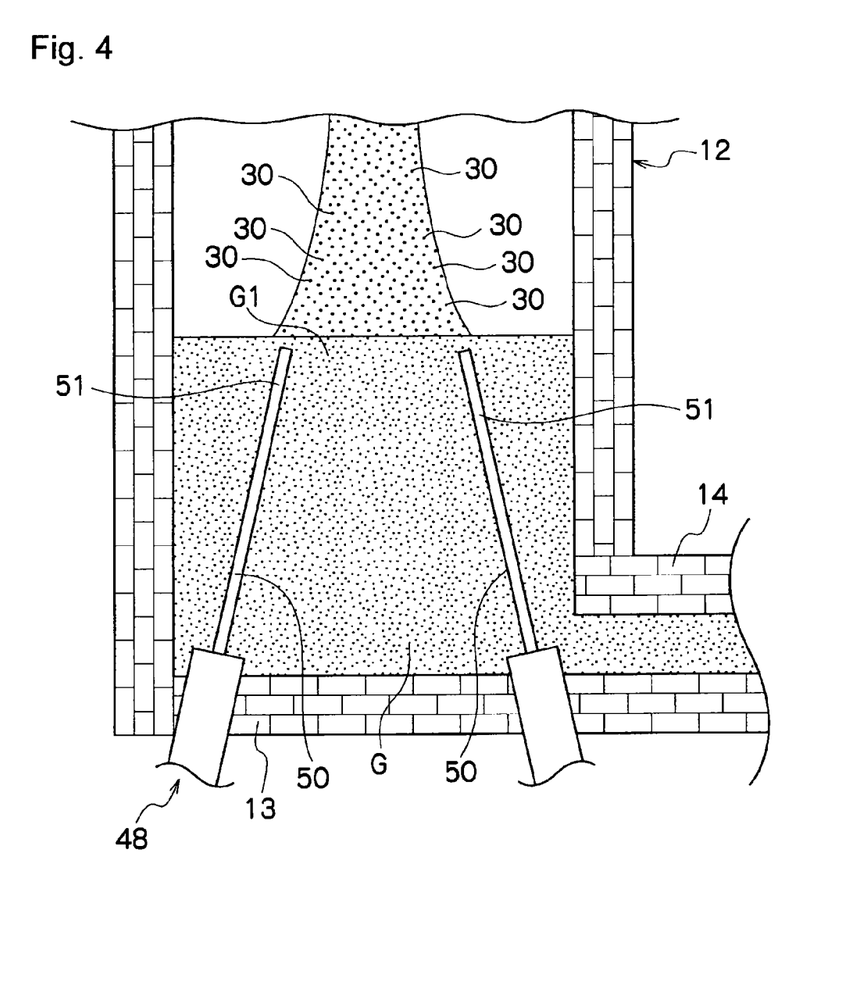
FIG. 4 is a structure view of a heating apparatus of a third embodiment.

FIG. 4 is a structure view of a heating apparatus 48 as a second heating means according to a third embodiment.

Electrodes 50, 50 of the heating apparatus 48 shown in the figure, that are heating portions, are each formed into a rod shape and inserted upwardly in an oblique direction through a furnace bottom portion 13 of a melting tank 12, and they are disposed so that the upper ends 51, 51 are substantially horizontally arranged at the same height position in the melting tank 12. In this example, the electrodes 50, 50 are disposed so that leading edge surfaces of leading edges of the electrodes, that actually contribute to electric heating, are present within 15 cm below the surface of molten glass liquid G, and that lower ends of lower ends of the leading edges, that actually contribute to electric heating, are present less than 50 cm below the surface of the molten glass liquid. Other parameters (such as heating temperature) are the same as those of the heating apparatus 38 shown in FIG. 2. Accordingly, also in the heating apparatus 48 of FIG. 4, the same effects as those of the heating apparatuses 38, 44 shown in FIGS. 2 and 3 can be obtained. Further, even in a case where the electrodes 50, 50 are disposed so that the upper end surfaces of the upper ends of the electrodes 50, 50 are present within 20 cm below the surface of the molten glass liquid G, degassing of the molten glass liquid G is smoothly carried out.

Figure 5:
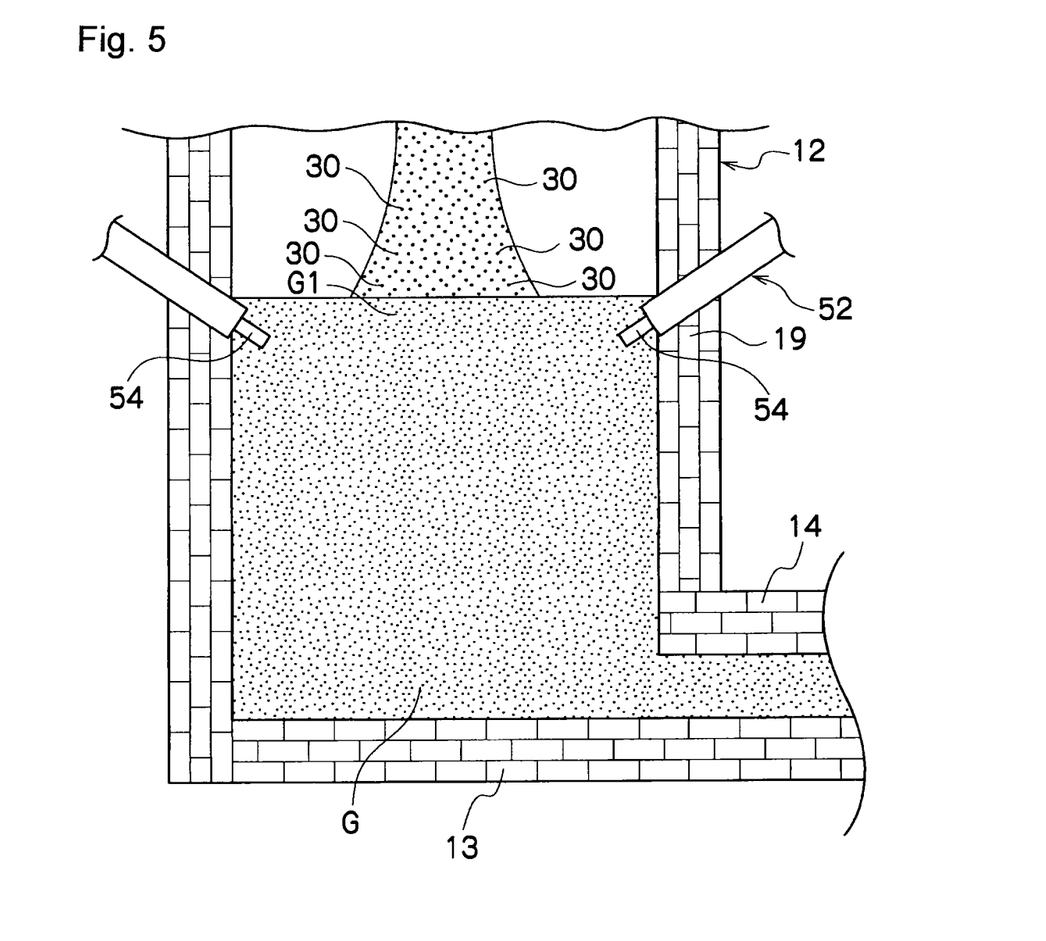
FIG. 5 is a structure view of a heating apparatus of a fourth embodiment.

FIG. 5 is a structure view of a heating apparatus 52 as a second heating means according to a fourth embodiment.

Heating portions of the heating apparatus 52 shown in the figure, that are electrodes 54, 54, are each formed into a rod shape and inserted in an oblique downward direction through a side wall of a melting tank 12. Further, the electrodes 54, 54 are disposed so that their leading edges, that are lower ends 55, 55, are immersed in the molten glass liquid, and that they are arranged substantially horizontally at the same height of the melting tank 12. As illustrated, the leading edges of the electrodes 54, 54 correspond to lower ends of the heating portions, and upper portions of the electrodes, that are in contact with the molten glass, correspond to upper ends of the heating portions. In this example, the electrodes are disposed so that the upper ends of the heating portions are present within 15 cm below the surface of the molten glass liquid G, and that the lower end of the leading edges of the heating portions are present at positions less than 50 cm below the surface of the molten glass liquid. Other parameters (such as heating temperature) are the same as those of the heating apparatus 38 shown in FIG. 2. Accordingly, also in the heating apparatus 52 of FIG. 5, the same effects as those of the heating apparatuses 38, 44, and 48 shown in FIGS. 2 to 4 can be obtained. Further, even in a case where the electrodes 54, 54 are disposed so that the upper end surfaces of the upper ends of the electrodes 54, 54 are present within 20 cm below the surface of the molten glass liquid G, degassing of the molten glass liquid G was smoothly promoted.

The heating apparatuses 38, 44, 48 and 52 being the second heating means described above are electric heating means for heating molten glass liquid G by producing an electric current through the molten glass liquid G.

Here, in order to hold each of the electrodes 40, 46, 50 and 54, a water-cooling holder is required. In a case of molybdenum electrode, since it is sublimated and worn at least 600° C., a portion that is not sealed by glass needs to be water-cooled. Since such a water-cooling causes heat loss, the temperature of a base portion of the electrode drops and the electric conductivity of the molten glass liquid G drops, and accordingly, the electric current tends to be concentrated on the leading edge. For this reason, in terms of the arrangement of the electrodes, the arrangement of the electrodes 50 in the third embodiment shown in FIG. 4 is preferred. Further, in the fourth embodiment shown in FIG. 5, when the bottom portions of the electrodes 54 are not configured to contact with the molten glass liquid G, another method in e.g. selection of the material becomes necessary, and as a result, another method of supporting the electrodes is considered.

FIGS. 6 to 9 described below, show a melting tank 12 employing a heat-generating body as the second heating means.

Figure 6:
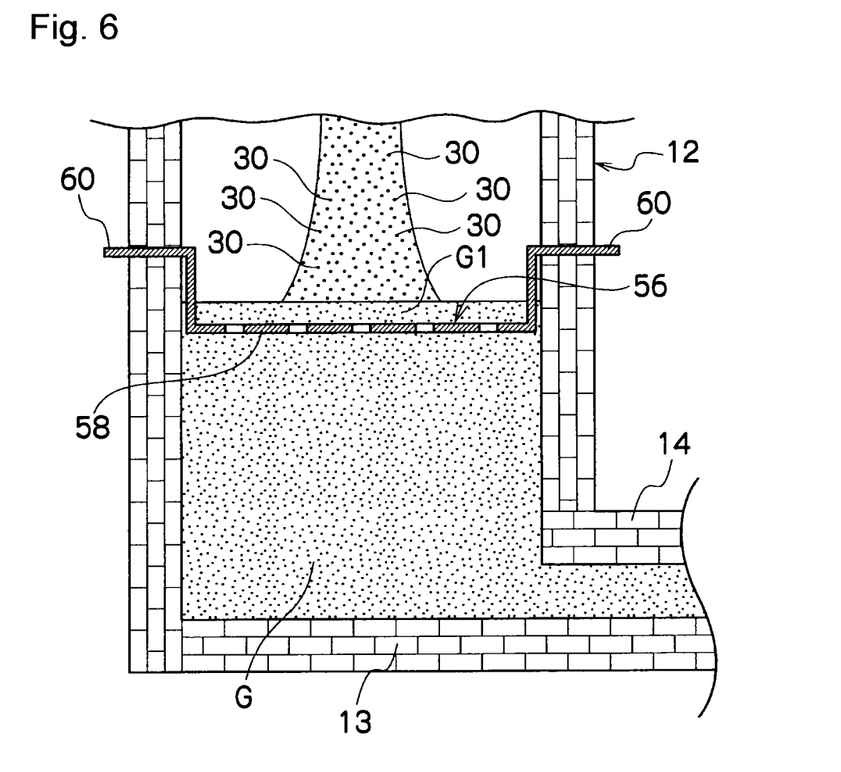
FIG. 6 is a structure view of a heating apparatus of a fifth embodiment.

FIG. 6 is a structure view of a heating apparatus 56 as the second heating means according to a fifth embodiment.

Figure 7:
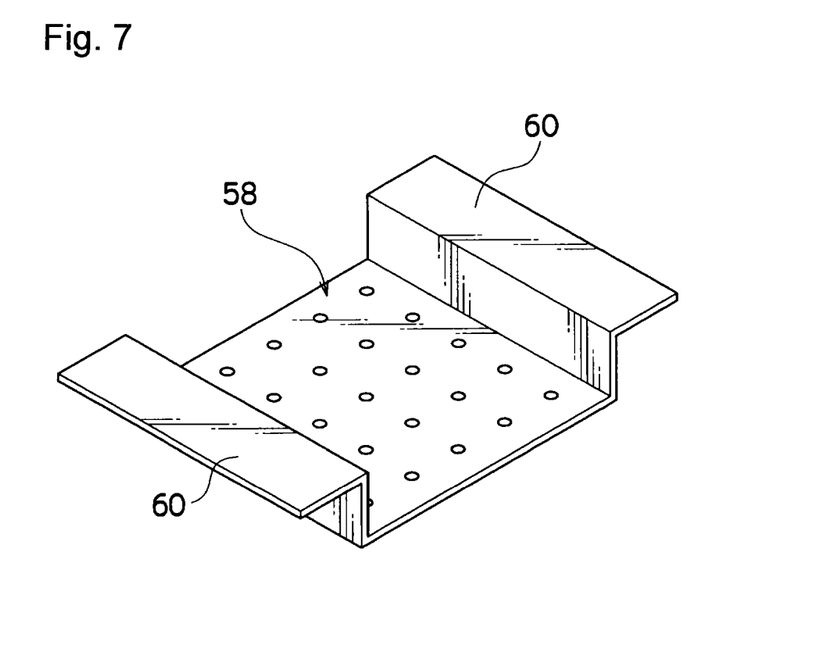
FIG. 7 is a perspective view of the heating apparatus shown in FIG. 6.

The heating apparatus 56 has a mesh plate 58, that is a heating portion, being a heat-generating body and having many holes as shown also in FIG. 7. This mesh plate 58 is immersed in a molten glass liquid G as shown in FIG. 6, electrode plates 60, 60 formed on both side of the mesh plate 58 are connected to a power supply, not shown, to cause electric current through the mesh plate 58 to heat the mesh plate 58 itself, thereby to heat an upper layer G1 of the molten glass liquid G by electric conduction. This mesh plate 58 is disposed so as to be substantially parallel with the surface of the molten glass liquid G, and has an area substantially equal to the horizontal cross-sectional area of the melting tank 12. As described above, by the heating apparatus 56, it is possible to heat the entire region of the upper layer G1 of the molten glass to have substantially uniform temperature. As the mesh plate 58, a heat-resistant plate made of e.g. platinum may, for example, be mentioned. In this example, the mesh plate 58 is disposed so as to be present within 15 cm below the surface of the molten glass liquid G. Further, in this example, the mesh plate 58 may be disposed at a position within 20 cm below the surface of the molten glass liquid G.

Figure 8:
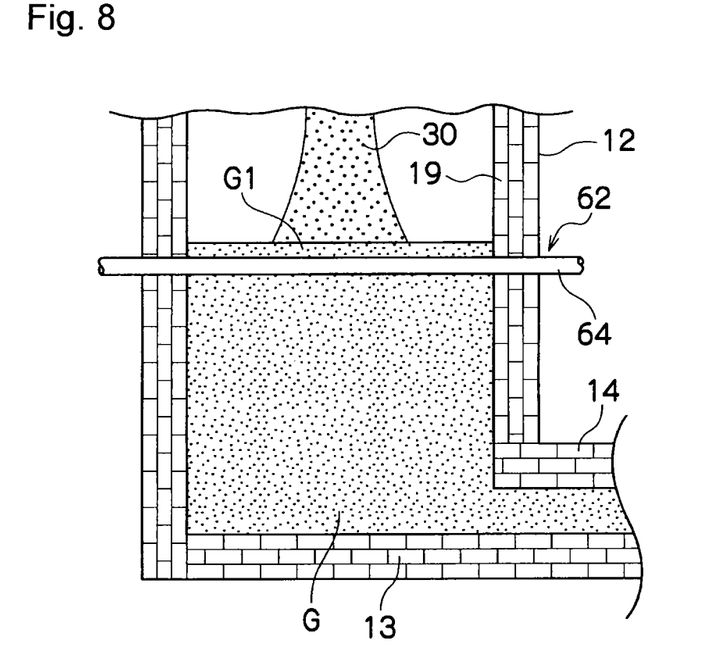
FIG. 8 is a structure view of a heating apparatus of a sixth embodiment.

FIG. 8 is a structure view of a heating apparatus 62 as the second heating means according to a sixth embodiment.

Figure 9:
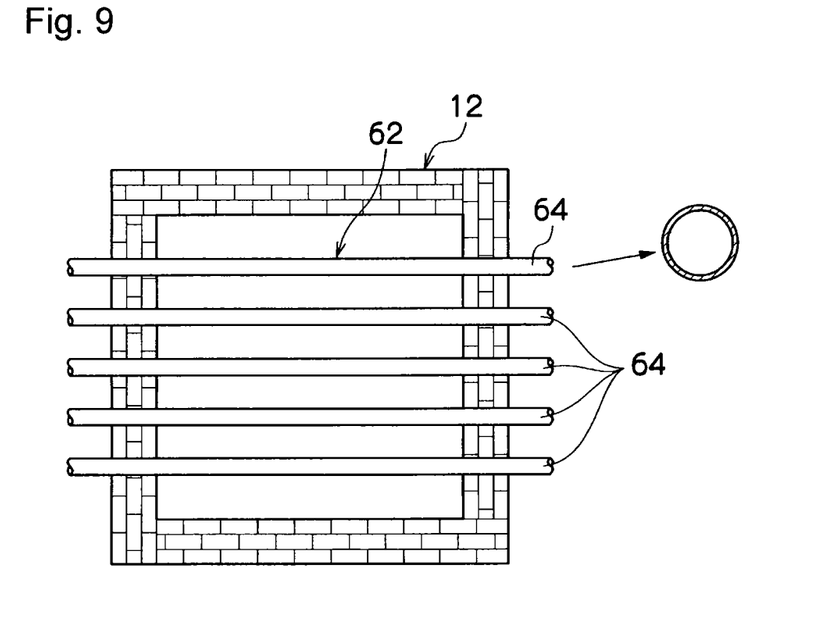
FIG. 9 is a plan view of the heating apparatus shown in FIG. 8.

This heating apparatus 62 has a plurality of (five in FIG. 9) combustion tubes 64, 64, that are heating portions, each being a heat-generating body and formed into a cylindrical shape shown also in FIG. 9. These combustion tubes 64, 64 are disposed in parallel with a predetermined pitch in horizontal direction through a side wall 19 of the melting tank 12 to constitute the heating apparatus 62. In the heating apparatus 62, by supplying a combustion gas to the combustion tubes 64, 64 and combusting the combustion gas in the combustion tubes 64, 64, the combustion tubes 64, 64 are heated, to heat an upper layer G1 of a molten glass liquid G by the heat of the combustion tubes 64, 64. As the combustion tube 64, one made of molybdenum disilicide may be mentioned. In this example, the combustion tubes 64, 64 are disposed within 15 cm below the surface of the molten glass liquid G. Further, in this example, the combustion tubes 64, 64 may be disposed within 20 cm below the surface of the molten glass liquid G.

Here, a refining agent may be mixed into the glass raw material particles of the present invention in the same manner as conventional glass raw materials in order to form bubbles in the molten glass, merge small bubbles to form large bubbles, and make the large bubbles surfacing to carry out degassing (refining). However, in the present invention, since the temperature of the gas phase atmosphere for forming liquid glass particles is high, the refining agent may evaporate. However, in the present invention, since there is a means for heating the upper layer of the molten glass liquid, even if the temperature of the gas phase atmosphere is lowered within the range where the glass raw material particles become liquid glass particles, in order to reduce evaporation of the refining agent contained in the glass raw material particles in the gas phase atmosphere, it is possible to smoothly promote degassing of the molten glass liquid and the liquid glass particle raw material particles fallen onto the surface of the molten glass liquid. Further, by lowering the temperature of the gas phase atmosphere, the refining agent evaporation of which is suppressed exhibits its effect in the molten glass liquid by the heating of the upper layer of the molten glass liquid, whereby the refining effect increases.

Figure 10:
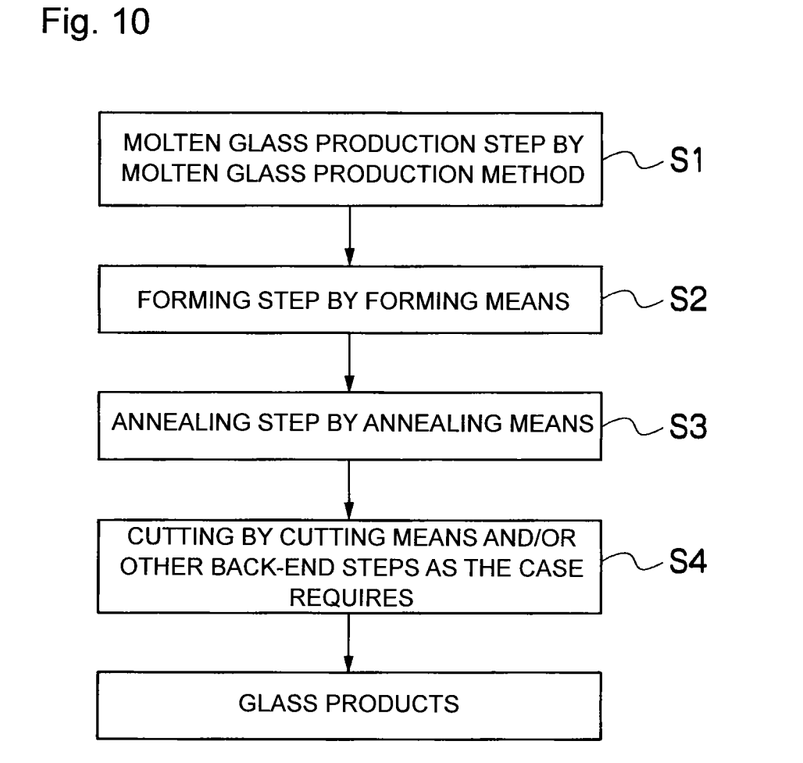
FIG. 10 is a flow chart showing a process for producing glass products of an embodiment of the present invention.

FIG. 10 is a flowchart showing an embodiment of the process for producing glass products. FIG. 10 shows constituent features of the process for producing glass products, that are a glass melting step (S1), a forming step (S2) by a forming means, an annealing step (S3) by an annealing means, and a cutting step and other back-end steps (S4) to be carried out as the case requires.

A molten glass liquid G produced in the melting tank 12 shown in FIGS. 1 to 9 is conveyed through an outlet and a conduit structure, not shown, to a forming means and is formed (forming step). The formed glass is annealed by an annealing means (annealing step) to prevent residual stress from remaining inside a solidified glass after forming. Further, the glass is cut (cutting step) and subjected to other back-end steps as the case requires, to be glass products.

For example, in a case of plate glass, the molten glass liquid G is formed into a glass ribbon by a forming means, it is annealed by an annealing means, cut into a desired size, and subjected to a back-end step such as a grinding step of glass ends to obtain a plate glass.

The molten glass produced by the process of the present invention, is not limited in the composition so long as the molten glass is one produced by in-flight heating melting method. Accordingly, it may be soda lime glass or borosilicate glass. Further, the application of the glass products to be produced is not limited to architecture and vehicle applications, and it may be flat panel display application or other various types of applications.

In a case of soda lime glass to be used for a plate glass for architecture or vehicle application, the glass preferably has a composition that $SiO_2$: 65 to 75%, $Al_2O_3$: 0 to 3%, CaO: 5 to 15%, MgO: 0 to 15%, $Na_2O$: 10 to 20%, $K_2O$: 0 to 3%, $Li_2O$: 0 to 5%, $Fe_2O_3$: 0 to 3%, $TiO_2$: 0 to 5%, $CeO_2$: 0 to 3%, BaO: 0 to 5%, SrO: 0 to 5%, $B_2O_3$: 0 to 5%, ZnO: 0 to 5%, $ZrO_2$: 0 to 5%, $SnO_2$: 0 to 3%, and $SO_3$: 0 to 0.5% in terms of mass percentage of oxide.

In a case of alkali-free glass to be employed for a substrate of liquid crystal display or organic EL display, the glass preferably has a composition that $SiO_2$: 39 to 70%, $Al_2O_3$: 3 to 25%, $B_2O_3$: 1 to 20%, MgO: 0 to 10%, CaO: 0 to 17%, SrO: 0 to 20% and BaO: 0 to 30% in terms of mass percentage of oxide.

In a case of mixed alkali glass to be employed for a substrate for plasma display, the glass preferably has a composition that $SiO_2$: 50 to 75%, $Al_2O_3$: 0 to 15%, MgO+CaO+SrO+BaO+ZnO: 6 to 24% and $Na_2O+K_2O$: 6 to 24% in terms of mass percentage of oxide.

As another application, in a case of a borosilicate glass to be used for e.g. a heat-resistant container or laboratory equipment, the glass preferably has a composition that $SiO_2$: 60 to 85%, $Al_2O_3$: 0 to 5%, $B_2O_3$: 5 to 20% and $Na_2O+K_2O$: 2 to 10% in terms of mass percentage of oxide.

INDUSTRIAL APPLICABILITY

By the glass-melting furnace and the process for producing molten glass of the present invention, since it is possible to smoothly promote degassing of molten glass liquid and liquid glass particles fallen onto the surface of the molten glass liquid, it is possible to produce a molten glass having a good quality.

Further, by the glass-melting furnace and the process for producing molten glass of the present invention, since it is possible to produce a large amount of molten glass having a good quality, it is possible to produce glass products having a good quality for a long duration.

This application is a continuation of PCT Application No. PCT/JP2010/070747, filed on Nov. 19, 2010, which is based upon and claims the benefit of priority from Japanese Patent Application No. 2009-265122 filed on Nov. 20, 2009. The contents of those applications are incorporated herein by reference in its entirety.

REFERENCE SYMBOLS

10 . . . glass-melting furnace, 12 . . . melting tank, 13 . . . furnace bottom portion, 14 . . . discharge port, 16 . . . degassing vessel, 18 . . . ceiling wall, 19 . . . side wall, 20 . . . raw material particle in-flight melting portion, 22 . . . flue, 24 . . . oxygen combustion burner, 26 . . . nozzle, F . . . flame, G . . . molten glass liquid, 30 . . . liquid glass particles, P . . . thermal plasma, 34 . . . electrode, 36 . . . multiphase arc plasma generation apparatus, 38 . . . heating apparatus, 40 . . . electrode, 44 . . . heating apparatus, 46 . . . electrode, 48 . . . heating apparatus, 50 . . . electrode, 51 . . . upper end of electrode 50, 52 . . . heating apparatus, 54 . . . electrode, 56 . . . heating apparatus, 58 . . . mesh plate, 60 . . . electrode plate, 62 . . . heating apparatus, 64 . . . combustion tube

What is claimed is:

1. A glass-melting furnace for changing glass raw material particles into liquid glass particles in a gas phase atmosphere in the glass-melting furnace, accumulating the liquid glass particles in a bottom portion of the glass-melting furnace to obtain a molten glass liquid and discharging the molten glass liquid;

the furnace comprising a glass raw material feed portion disposed downwardly from a furnace wall portion in an upper portion of the glass-melting furnace;

a first heating device to form a gas phase portion under the glass raw material particle feed portion for changing the glass raw material particles into liquid glass particles;

a second heating device to heat an upper layer of the molten glass liquid;

a furnace bottom portion to accumulate the liquid glass particles to form the molten glass liquid; and a discharge portion to discharge the molten glass liquid, wherein the glass raw material particle feed portion is integrated with the first heating device, and the second heating device is disposed so that at least a part of the upper end or the leading edge of a heating portion of the second heating device is present within 10 cm below a planned surface level of the molten glass liquid.

2. The glass-melting furnace according to claim 1, wherein the second heating device is disposed so that the lower end of a heating portion of the second heating device is present less than 50 cm below a planned surface level of the molten glass liquid.

3. The glass-melting furnace according to claim 1, wherein the second heating device is at least one of an electric heater having electrodes to supply electricity to the molten glass liquid, and a heat-generating body.

4. The glass-melting furnace according to claim 3, comprising the heat-generating body which has a heat generator to heat the molten glass liquid by thermal conduction.

5. The glass-melting furnace according to claim 3, wherein the heat-generating body is a plate-shaped body having a heat-generating surface disposed in the horizontal direction.

6. The glass-melting furnace according to claim 3, wherein the heat-generating body is a combustion gas tube disposed so that the axis of the combustion tube is in the horizontal direction.

7. The glass-melting furnace according to claim 1, wherein the first heating device is an oxygen combustion burner producing an oxygen combustion flame or a multi-phase arc plasma generation apparatus constituted by at least a pair of electrodes producing thermal plasma.

8. An apparatus for producing glass products, comprising the glass-melting furnace as defined in claim 1, a former to form a molten glass, that is provided on the downstream side of the discharge portion of the glass-melting furnace, and an annealer to anneal the formed glass.

9. The glass-melting furnace as defined in claim 1, wherein the first heating device is an oxygen combustion burner.

10. The glass-melting furnace as defined in claim 1, wherein the first heating device and the glass raw material particle feed portion are coaxially arranged.

11. The glass-melting furnace as defined in claim 1, wherein the glass raw material particle feed portion comprises a tube for feeding glass raw material particles; the tube is integrated with an oxygen combustion burner; and a tube for supplying a combustion gas and the tube for feeding glass raw material particles are coaxially arranged in the vicinity of an outlet of the oxygen combustion burner.

* * * * *